March 12, 1968  R. L. CREMER  3,372,512
PLASTIC AXLE BEARINGS FOR USE ON TOY VEHICLES
Filed Dec. 28, 1965
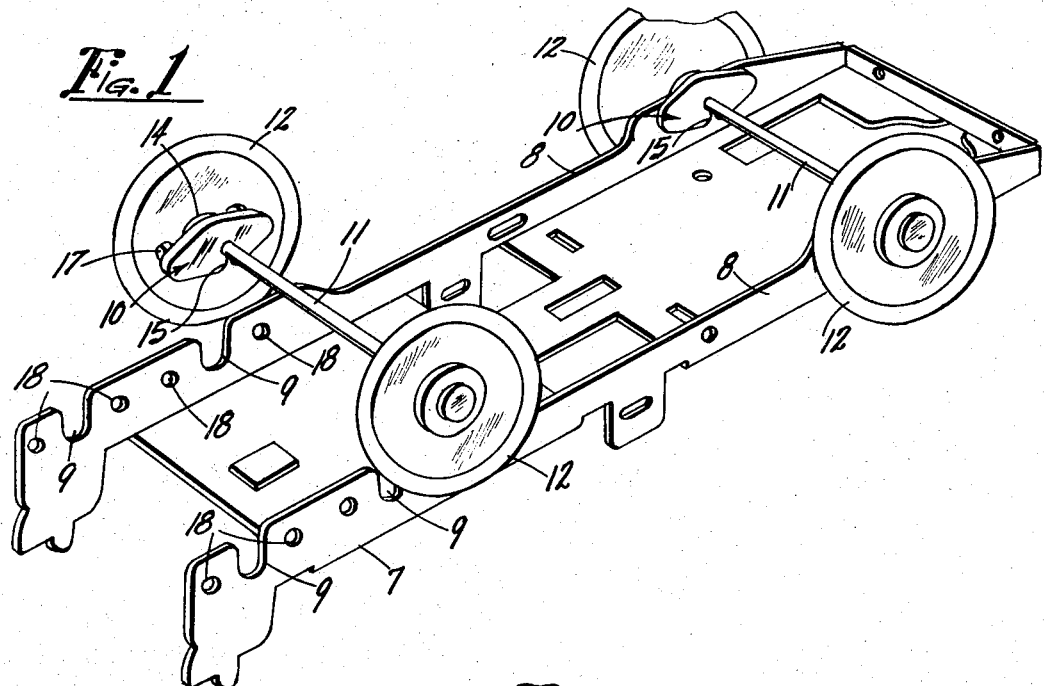
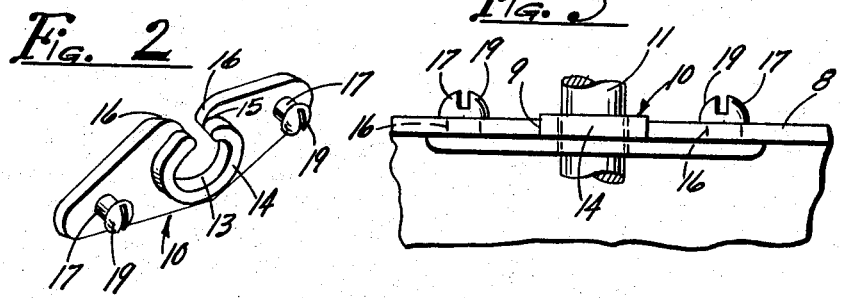
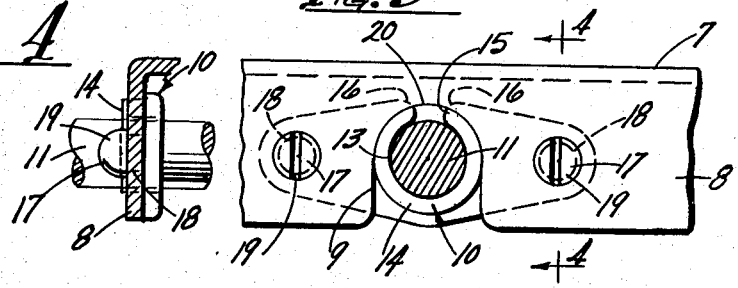
INVENTOR
ROBERT L. CREMER
ATTORNEY.

United States Patent Office 3,372,512
Patented Mar. 12, 1968

3,372,512
PLASTIC AXLE BEARINGS FOR USE ON TOY VEHICLES
Robert L. Cremer, Freeport, Ill., assignor to King-Seeley Thermos Co., Ann Arbor, Mich., a corporation of Michigan
Filed Dec. 28, 1965, Ser. No. 526,655
6 Claims. (Cl. 46—221)

ABSTRACT OF THE DISCLOSURE

This plastic bearing is of flexible, resilient, material, circular in form, and open peripherally on one side a width less than the diameter of the axle to be entered from that side by spreading the bearing, the bearing member with the axle entered therein fitting closely in an opening of generally rectangular form provided in the bearing support with its entrance at one edge of the support to allow entry of an axle therein with the bearing member in place on the axle. The bearing member has lateral integral extensions in diametrically opposed relation on each of which is a stud integral therewith and extending at right angles thereto to be pressed into holes provided in the support with a tight friction fit to secure the bearing member in place, the studs each having a head on the outer end of larger diameter than the studs which when pressed through the holes in the support are compressed and upon emergence from the holes expand to their normal diameter to better secure the bearing member in place.

---

This invention relates to a snap-on type plastic bearing for use on toy vehicles, the principal advantages derived therefrom being, first of all, greater economy and greater durability, and, secondly, saving in cost of assembling, from the standpoint that this bearing in its preferred form makes possible and practical the preliminary assembling of wheels on the axles before the axles with the bearings snapped thereon are assembled in the slots provided therefor in the chassis and snapped in place on the chassis.

The invention is illustrated in the accompanying drawing, in which—

FIG. 1 is a perspective view of a toy vehicle chassis looking at the bottom thereof, showing one axle installed with the present improved type of plastic snap-on bearings, and the other axle with the bearings snapped thereon ready to be installed, both axles having their wheels already applied thereto prior to mounting in the chassis;

FIGS. 2, 3 and 4 are a side, bottom, and end view, respectively, of the bearing showing it installed, FIG. 4 being partly in section on the line 4—4 of FIG. 2, and FIG. 5 is a perspective view of the bearing by itself.

The same reference numerals are applied to corresponding parts throughout the views.

Referring to the drawing, the reference numeral 7 designates the sheet metal chassis of a toy vehicle having longitudinally extending flanges 8 in spaced parallel relation along its opposite sides, in which generally U-shaped slots 9 are provided to accommodate the plastic bearings of my invention, indicated generally by the reference numeral 10, to mount the axles 11 on the chassis after the wheels 12 have been assembled on both ends of the axle. An appreciable saving in cost of production is thereby realized and a far better grade product is also made possible in this way, as distinguished from prior constructions where the axles had to be assembled in the bearings on the chassis first before the wheels could be applied to the opposite ends or at least one end. The plastic bearings 10 are not only cheaper than what were used previously but are far better, and they actually upgrade the final toy vehicle considerably by virtue of the sound deadening action they give, as distinguished from the tinny or metallic sounds given by other toys when the wheels thereof are banged onto the floor.

The bearings 10 are preferably of flexible resilient polyethylene, although certain rubbers or any other similar resilient flexible plastic material may be used, it being important that the bearings be expansible and compressible radially, expansibility being desirable to enable spreading the bearings in the preliminary snapping thereof onto the axle 11 so as to enter the axle in the bearing openings 13, these openings being slightly larger in diameter than the axle 11 so that when the bearing collar portions 14 are subsequently compressed radially in forcing the same axially or endwise into the slots 9, the resulting small reduction in diameter of the bearing openings 13 will still leave enough operating clearance for the axle 11 to be free to turn therein as the axles 11 are pressed into the wheels and have to turn with the wheels in the operation of the toy vehicle. To facilitate entry of the axle 11 in the bearing opening 13, the radial entry slot 15, which is smaller in width than the diameter of the axle 11 and the bearing opening 13 has outwardly diverging rounded sides at the entrance, as indicated at 16 in FIGS. 2 and 5. Hence, to snap the bearing 10 over an axle 11, one need only apply a slight pressure to the back of the bearing as the axle rides on the diverging surfaces 16, and the bearing 10 will be spread enough for the axle to pass through the slot 15 and snap into place in the bearing opening 13. At this point, the axle fits loosely in the bearing opening, but the bearing cannot drop off the axle. There then remains only the matter of snapping the two studs 17 provided on opposite ends of each bearing through the two holes 18 provided on opposite sides of each slot 9 in the flanges 8, this being done preferably from the inner side of the flanges so that the wheels 12 will not have to be spaced too far from the sides of the chassis and also because this makes for ease of assembling. Each of the studs 17 has a diametrically slotted head 19 which can be compressed radially enough to be forced through the related hole 18 in the flange 8 and, once the head gets through the hole, it expands immediately and makes the fastening very secure so that a child is not at all apt to succeed in dislodging the bearing and it becomes a really permanent part of the assembly for the life of the toy.

In operation, the axles 11 come to the assembly line with the wheels 12 assembled thereon, and, in mounting the same on the chassis, the operator first snaps a pair of bearings 10 onto each axle, being sure to get the bearings turned so that their studs 17 project outwardly toward the inner sides of the flanges 8 on both sides of the chassis, so that it is a simple matter to force these studs through the holds 18 while at the same time entering the bearing collar portion 14 on each bearing endwise into its slots 9, compressing it radially to whatever slight extent may be necessary, and, of course, once the bearing collar 14 is thus assembled in the slot with its open upper side abutting the semi-circular upper end portion 20 of the slot, this portion is supported well enough so as not to spread when there is any downward pressure applied to the chassis. The axle is therefore given almost as much bearing support as if the collar 14 were a complete one. The sound deadening effect obtained with these plastic bearings is highly desirable and a welcome change from the tinny or metallic sounds previously given by even the more expensive toys.

It is believed the foregoing description conveys a good understanding of the objects and advantages of my invention. The appended claims have been drawn to cover all legitimate modifications and adaptations.

I claim:

1. An axle bearing construction comprising, in combination, a bearing support having a generally rectangular opening with an entrance at one edge of said support to allow entry of an axle therein in transverse relationship to said support, a circular bearing member of flexible, resilient, non-metallic bearing material, said bearing member with the axle entered therein fitting closely in said opening, said support having a hole provided therein in a predetermined spaced relation to said bearing opening, and said bearing member having a lateral integral extension for abutment with said support alongside said bearing opening on which extension a stud is provided integral therewith and extending at right angles thereto and arranged to be pressed into said hole with a tight friction fit to secure said bearing member in place in said opening and against displacement from said support, the stud on said extenison having a head on the outer end thereof of larger diameter than the stud which when pressed through the hole in said support is compressed and upon emerging from the hole expands to its normal diameter to better secure said bearing member in place.

2. An axle bearing construction as set forth in claim 1 wherein there is another lateral integral extension on said bearing member in diametrically opposed relation to the first mentioned extension for abutment with said support alongside said bearing opening on the diametrically opposite side from said first extension, said additional extension having a second stud provided integral therewith and extending at right angles thereto and arranged to be pressed into a second hole provided in said support with a tight friction fit to secure said bearing member in place and against displacement from said support, the second stud having a head on the outer end thereof of larger diameter than the stud, which, when pressed through the hole in said support, is compressed and upon emerging from the hole expands to its normal diameter to better secure said bearing member in place.

3. An axle bearing construction comprising, in combination, a bearing support having a generally rectangular opening with an entrance at one edge of said support to allow entry of an axle therein in transverse relationship to said support, a circular bearing member of flexible, resilient, non-metallic bearing material open peripherally on one side a width less than the diameter of the axle to enable entering the axle in the bearing member transversely thereof by spreading said bearing member, the axle then fitting loosely and rotatably in said bearing member, said bearing member with the axle entered therein fitting closely in said opening with its peripheral opening innermost, said support having a hole provided therein in a predetermined spaced relation to said bearing opening, and said bearing member having a lateral integral extention for abutment with said support alongside said bearing opening on which extension a stud is provided integral therewith and extending at right angles thereto and arranged to be pressed into said hole with a tight friction fit to secure said bearing member in place in said opening and against displacement from said support, the stud on said extension having a head on the outer end thereof of larger diameter than the stud which when pressed through the hole in said support is compressed and upon emerging from the hole expands to its normal diameter to better secure said bearing member in place.

4. An axle bearing construction as set forth in claim 3 wherein there is another lateral integral extension on said bearing member in diametrically opposed relation to the first mentioned extension for abutment with said support alongside said bearing opening on the diametrically opposite side from said first extension, said additional extension having a second stud provided integral therewith and extending at right angles thereto and arranged to be pressed into a second hole provided in said support with a tight friction fit to secure said bearing member in place and against displacement from said support, the second stud having a head on the outer end thereof of larger diameter than the stud, which, when pressed through the hole in said support, is compressed and upon emerging from the hole expands to its normal diameter to better secure said bearing member in place.

5. An axle bearing construction comprising, in combination, a bearing support having an opening provided therein adapted to receive an axle in transverse relationship to said support, a circular bearing member of flexible, resilient, non-metallic bearing material having the axle entered therein, said bearing member fitting closely in said opening, said support having a hole provided therein in a predetermined spaced relationship to the bearing opening, said bearing member having a lateral integral extension for abutment with said support alongside said bearing opening on which extension a stud is provided integral therewith and extending at right angles thereto and arranged to be pressed into said hole with a tight friction fit to secure said bearing member in place in said opening and against displacement from said support, the stud on said extension having a head on the outer end thereof of larger diameter than the stud, which, when pressed through the hole in said support, is compressed and upon emerging from the hole expands to its normal diameter to better secure said bearing member in place.

6. An axle bearing construction as set forth in claim 5, wherein there is another lateral integral extension on said bearing member in diametrically opposed relation to the first mentioned extension for abutment with said support alongside said bearing opening on the diametrically opposite side from said first extension, said additional extension having a second stud provided integral therewith and extending at right angles thereto and arranged to be pressed into a second hole provided in said support with a tight friction fit to secure said bearing member in place and against displacement from said support, the second stud having a head on the outer end thereof of larger diameter than the stud, which, when pressed through the hole in said support, is compressed and upon emerging from the hole expands to its normal diameter to better secure said bearing member in place.

References Cited

UNITED STATES PATENTS

| 781,426 | 1/1905 | Hollingworth | 308—22 |
| 3,053,368 | 9/1962 | Klahn | 308—3.8 |
| 3,215,476 | 11/1965 | Jacobs | 308—3.8 |
| 3,307,291 | 3/1967 | Cremer | 46—222 |

MARTIN P. SCHWADRON, *Primary Examiner.*

M. FEIGENBAUM, *Assistant Examiner.*